(12) United States Patent
Iida et al.

(10) Patent No.: US 8,218,937 B2
(45) Date of Patent: Jul. 10, 2012

(54) OPTICAL FILM, IMAGE DISPLAY DEVICE, DIETHYNYLFLUORENE, AND POLYMER THEREOF

(75) Inventors: Toshiyuki Iida, Ibaraki (JP); Yutaka Ohmori, Ibaraki (JP); Miyuki Kurogi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 514 days.

(21) Appl. No.: 12/443,558

(22) PCT Filed: Sep. 21, 2007

(86) PCT No.: PCT/JP2007/068368
§ 371 (c)(1),
(2), (4) Date: May 21, 2009

(87) PCT Pub. No.: WO2008/041510
PCT Pub. Date: Apr. 10, 2008

(65) Prior Publication Data
US 2010/0003490 A1    Jan. 7, 2010

(30) Foreign Application Priority Data

Oct. 2, 2006   (JP) ................................ 2006-270530
Feb. 14, 2007  (JP) ................................ 2007-032858

(51) Int. Cl.
*G02B 6/00*   (2006.01)
(52) U.S. Cl. ........................................ 385/142; 385/145
(58) Field of Classification Search .................... 428/1.1, 428/1.2, 1.26; 528/170; 385/142, 145
See application file for complete search history.

(56) References Cited

U.S. PATENT DOCUMENTS
5,750,641 A    5/1998   Ezzell et al.

FOREIGN PATENT DOCUMENTS
| JP | 2000-511296 A | 8/2000 |
| JP | 2005-015442 A | 1/2005 |
| JP | 2005-097230 A | 4/2005 |
| JP | 2006-003715 A | 1/2006 |

OTHER PUBLICATIONS

Chinese Office Action dated Feb. 17, 2011, issued in corresponding Chinese Patent Application No. 200780036966.9 with partial English translation.

International Search Report of PCT/JP2007/068368 with the mailing date of Dec. 25, 2007.

*Primary Examiner* — Jafar Parsa
(74) *Attorney, Agent, or Firm* — Westerman, Hattori, Daniels & Adrian, LLP

(57) ABSTRACT

An optical film of the present invention comprises a polyimide-based polymer represented by the following general formula (V).

[Formula 1]

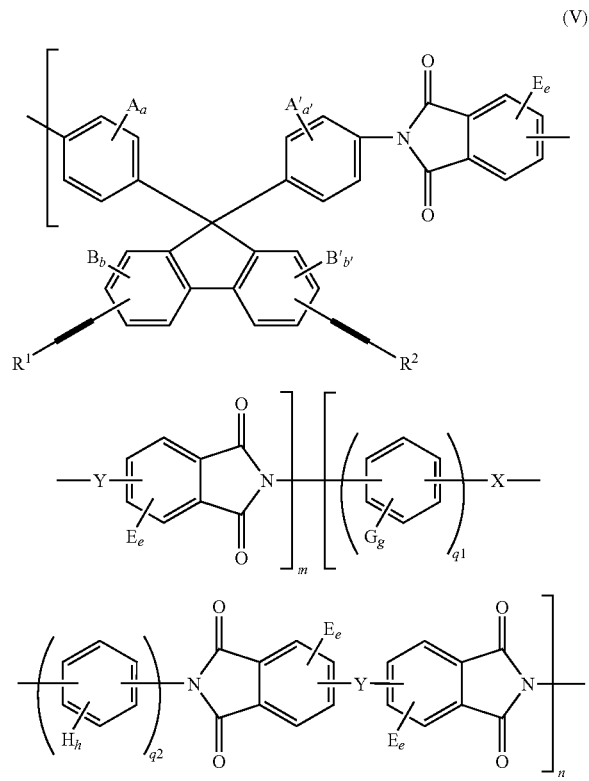

The optical film of the present invention exhibits an optical property such that wavelength dispersion of retardation scarcely changes ranging from the short wavelength side to the long wavelength side.

Typically, the optical film of the present invention may be used as a retardation film of a liquid crystal display device.

13 Claims, 3 Drawing Sheets

OPTICAL FILM, IMAGE DISPLAY DEVICE, DIETHYNYLFLUORENE, AND POLYMER THEREOF

BACKGROUND ART

The present invention relates to an optical film, an image display device, and diethynylfluorene used for a forming material of the optical film, and a polymer containing the diethynylfluorene.

A retardation film is an optical film for compensating a liquid crystal cell or the like, which is utilized for, for example, realizing a wider viewing angle or the like of a liquid crystal display. The retardation of the retardation film depends on wavelength, and the wavelength dispersion of the retardation is roughly classified into the following three kinds. The first exhibits wavelength dispersion such that a retardation value is larger on the shorter wavelength side (hereinafter referred to as 'normal dispersion'), the second exhibits wavelength dispersion such that a retardation value scarcely changes ranging from the short wavelength side to the long wavelength side (hereinafter referred to as 'flat dispersion'), and the third exhibits wavelength dispersion such that a retardation value is smaller on the shorter wavelength side (hereinafter referred to as 'inverse dispersion').

Here, the normal dispersion and the inverse dispersion are optical properties such that the wavelength dependence of the retardation is large, and the flat dispersion is optical property such that the wavelength dependence of the retardation is small.

Among such three kinds of retardation films, as the film exhibiting the flat dispersion, a norbornene-based film (for example, trade name: ARTON FILM, manufactured by JSR Corporation) obtained by film-forming and drawing a norbornene-based resin has been conventionally utilized. However, the norbornene-based film is so comparatively thick as approximately 60 to 80 μm that, accordingly, thin and lighter weight of an optical member can't be achieved.

On the other hand, it is known that polyimide exhibits predetermined retardation by coating on a base material (Patent Document 1). Thus, a retardation film containing polyimide may be formed comparatively thinly. However, polyimide ordinarily exhibits the normal dispersion, so that a retardation film using this does not exhibit the flat dispersion.
[Patent Document 1] Japanese translation of PCT international application No. 2000-511296

DISCLOSURE OF THE INVENTION

Then, an object of the present invention is to provide an optical film exhibiting preferable wavelength dispersion and capable of being formed comparatively thinly, and an image display device using the same. Another object of the present invention is to provide diethynylfluorene appropriate as a material for forming the above-mentioned optical film.

Conventionally, VA (Vertical Alignment) mode has widely prevailed as a liquid crystal cell of a liquid crystal display. When the inventors of the present invention examined wavelength dispersion of a liquid crystal cell in this VA mode in detail, they have found that a liquid crystal cell in VA mode exhibiting the flat dispersion has been increasing in recent years. Thus, a retardation film for compensating this is preferably a material whose wavelength dispersion exhibits the flat dispersion. However, as described above, the conventional retardation film has both merits and demerits. For this reason, the inventors of the present invention have earnestly studied about various materials, and found out that the use of a polymer having a fluorene skeleton with a triple bond group (—C≡C—R) allows the above-mentioned object to be achieved.

The present invention provides an optical film comprising a polymer having a repeating unit represented by the following general formula (I).

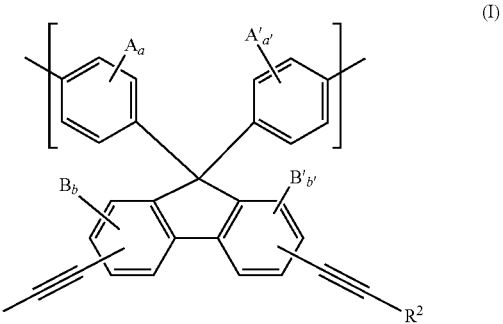

Here, in the formula (I), A, A', B and B' each denote a substituent, a and a' denote substitution number (an integer of 0 to 4) of the corresponding A and A', and b and b' denote substitution number (an integer of 0 to 3) of the corresponding B and B'. A, A', B and B' each independently denote halogen or an alkyl group with a carbon number of 1 to 4. $R^1$ and $R^2$ each independently denote hydrogen, halogen, an alkyl group with a carbon number of 1 to 10, a substituted or unsubstituted aryl group, a substituted or unsubstituted vinyl group, a substituted or unsubstituted ethynyl group, $SiR^3R^4R^5$ ($R^3$ to $R^5$ are each an alkyl group with a carbon number of 1 to 6 or an aryl group), or $CR^6R^7(OH)$ ($R^6$ and $R^7$ are each an alkyl group with a carbon number of 1 to 4).

With regard to the polymer into which the repeating unit represented by the above-mentioned formula (I) is introduced, the conjugated system of a fluorene skeleton is extended by a triple bond group (an ethynyl group) and the fluorene skeleton is aligned in the orthogonal direction to the main chain. For this reason, in an optical film obtained by forming the polymer into a film, the wavelength dispersion of the retardation approaches flatness.

As one preferable embodiment of the present invention, it provides the above-mentioned optical film comprising a polyimide-based polymer, and the polyimide-based polymer has the repeating unit represented by the above formula (I).

If the polymer having the repeating unit of the above-mentioned formula (I) is a polyimide-based polymer, an optical film may be produced by a coating film. Accordingly, the optical film may also be formed comparatively thinly.

Further, the present invention provides an image display device (preferably a liquid crystal display device) having the above-mentioned optical film.

Also, the present invention provides diethynylfluorene represented by the following formula (X).

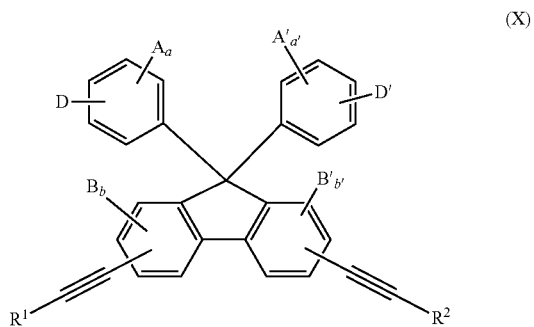

Here, in the formula (X), A, A', B and B' each denote a substituent, a and a' denote substitution number (an integer of 0 to 4) of the corresponding A and A', and b and b' denote substitution number (an integer of 0 to 3) of the corresponding B and B'. A, A', B and B' each independently denote halogen or an alkyl group with a carbon number of 1 to 4. $R^1$ and $R^2$ each independently denote hydrogen, halogen, an alkyl group with a carbon number of 1 to 10, a substituted or unsubstituted aryl group, a substituted or unsubstituted vinyl group, a substituted or unsubstituted ethynyl group, $SiR^3R^4R^5$ ($R^3$ to $R^5$ are each an alkyl group with a carbon number of 1 to 6 or an aryl group), or $CR^6R^7(OH)$ ($R^6$ and $R^7$ are each an alkyl group with a carbon number of 1 to 4). D and D' each independently denote an OH group, an NHR group (wherein this R denotes hydrogen or an alkyl group with a carbon number of 1 to 4), a COOH group, or an NCO group.

In preferable diethynylfluorene of the present invention, $R^1$ and $R^2$ of the above-mentioned formula (X) are each independently hydrogen, an alkyl group with a carbon number of 1 to 6, a trimethylsilyl group, or a $C(CH_3)_2(OH)$ group.

Also, in preferable diethynylfluorene of the present invention, at least one of $R^1$ and $R^2$ of the above-mentioned formula (X) is a trimethylsilyl group.

Further, in preferable diethynylfluorene of the present invention, D and D' of the above-mentioned formula (X) is an $NH_2$ group.

Also, the present invention provides a polymer comprising the above-mentioned diethynylfluorene as a repeating unit.

An optical film of the present invention may be appropriately used as a retardation film for compensating a liquid crystal cell in VA mode, for example, for the reason that the wavelength dispersion of the retardation exhibits the flat dispersion.

Further, an optical film of the present invention may also be formed comparatively thinly, for the reason that the optical film develops birefringence by a coating film formed by coating.

An image display device provided with such an optical film may perform a favorable improvement in viewing angle, and intend to be thin and lighter weight.

In addition, the introduction of diethynylfluorene of the present invention into a proper polymer allows a polymer in which the wavelength dispersion of the retardation may approach flatness.

DETAILED DESCRIPTION OF THE INVENTION

Figure 1:
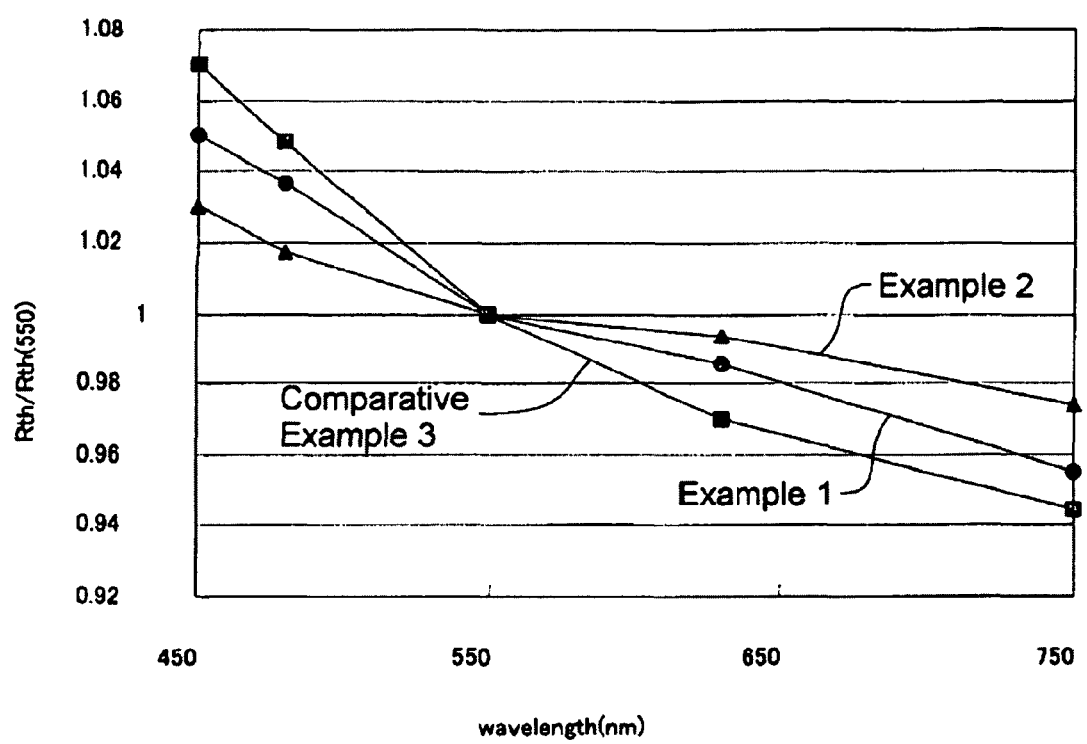
FIG. 1 is a graph view showing the wavelength dispersion of Examples 1 and 2 and Comparative Example 3.

The inventors of the present invention have found out that the retardation of the film in the visible light range with a wavelength of 450 to 750 nm approaches the flat dispersion by forming the polymer having the repeating unit represented by the general formula (I) into a film. The present invention provides an optical film exhibiting the flat dispersion (the wavelength dependence of the retardation is small) by exclusively utilizing this property.

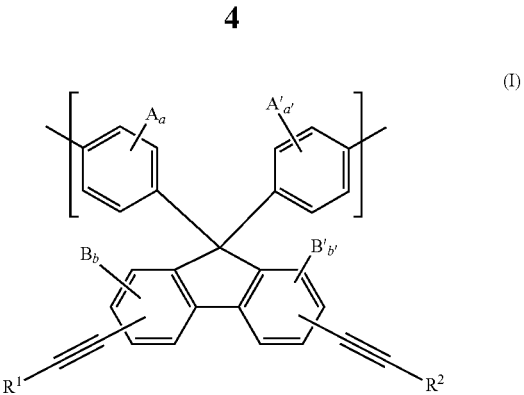

(I)

In the formula (I), A, A, B and B' each denote a substituent, a and a' denote substitution number (an integer of 0 to 4) of the corresponding A and A, and b and b' denote substitution number (an integer of 0 to 3) of the corresponding B and B'. A, A', B and B' each independently denote halogen or an alkyl group with a carbon number of 1 to 4, and $R^1$ and $R^2$ each independently denote hydrogen, halogen, an alkyl group with a carbon number of 1 to 10, a substituted or unsubstituted aryl group, a substituted or unsubstituted vinyl group, a substituted or unsubstituted ethynyl group, $SiR^3R^4R^5$ ($R^3$ to $R^5$ are each an alkyl group with a carbon number of 1 to 6 or an aryl group), or $CR^6R^7(OH)$ ($R^6$ and $R^7$ are each an alkyl group with a carbon number of 1 to 4).

Among the polymer having the repeating unit represented by the above-mentioned formula (I), the polymer having the repeating unit represented by the following formula (IV) is preferable.

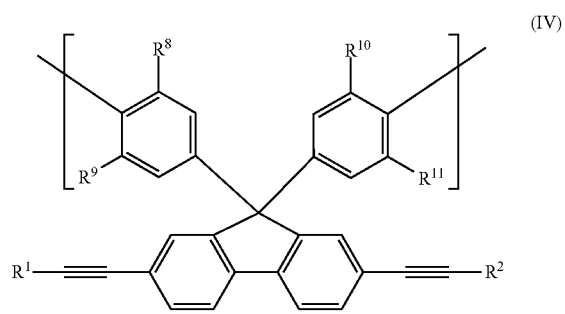

(IV)

In the formula (IV), $R^8$ to $R^{11}$ each independently denote hydrogen or an alkyl group with a carbon number of 1 to 4, and $R^1$ and $R^2$ are the same as the formula (I).

In the repeating unit of the formula (IV), at least one of $R^8$ and $R^9$ preferably is a methyl group and at least one of $R^{10}$ and $R^{11}$ preferably is a methyl group. It is because that the polymer having the above-mentioned repeating unit is excellent in transparency and solvent solubility. In the formula (I) and the formula (IV), preferably, the $R^1$ and $R^2$ are each independently hydrogen, an alkyl group with a carbon number of 1 to 6, a trimethylsilyl group, or a $C(CH_3)_2(OH)$ group. In particularly, an alkyl group with a carbon number of 1 to 6, a trimethylsilyl group, or a $C(CH_3)_2(OH)$ group is more preferably.

With regard to the polymer into which the repeating unit represented by the above-mentioned formula (I) (and formula (IV)) is introduced, the conjugated system of a fluorene skeleton is extended by a triple bond group (an ethynyl group) and the fluorene skeleton is aligned in the orthogonal direction to the main chain. For this reason, in the polymer of the present invention, the wavelength dispersion of the retardation becomes large at the part having the repeating unit represented by the formula (I). Accordingly, the more the repeating unit of the formula (I) is introduced into the polymer, the more the wavelength dispersion of the retardation of the obtained film approaches a flat state such that a retardation value scarcely changes ranging from the short wavelength side to the long wavelength side.

The introduction amount of the repeating unit represented by the above-mentioned formula (I) (and formula (IV)) is not particularly limited but 1% by mol or more of the whole polymer may be contained. However, as described above, the more the formula (I) is introduced into the polymer, the more an optical film obtained by forming the polymer into a film approaches the flat dispersion. For this reason, the polymer preferably contains 5% by mol or more of the formula (I), more preferably 10% by mol or more, and particularly preferably 12.5% by mol or more of the whole polymer.

On the other hand, excessively large introduction amount of the formula (I) brings a possibility of not giving an optical film excellent in heat resistance, rigidity and transparency. For this reason, the upper limit of the introduction amount of the above-mentioned formula (I) is preferably 90% by mol or less, more preferably 60% by mol or less, and particularly preferably 40% by mol or less.

The repeating unit represented by the above-mentioned formula (I) may be introduced as one part of the repeating unit of various kinds of polymers such as a polyimide-based polymer, a polyester-based polymer, a polyamide-based polymer, a polyamide-imide-based polymer, a polyvinyl alcohol-based polymer, a polycarbonate-based polymer, and the like. In the present invention, the various polymers into which the repeating unit is introduced may be used for a forming material of an optical film. Among them, the polyimide-based polymer having the repeating unit represented by the above-mentioned formula (I) is preferably used for a forming material of an optical film, since the polyimide-based polymer is excellent in heat resistance, a refractive index thereof is comparatively high, and the polymer exhibits predetermined retardation value in the state of coating film.

Examples of the polyimide-based polymer include polyimide high in in-plane alignment property and soluble in organic solvent, which is described in U.S. Pat. Nos. 5,071,997 and 5,480,964, Japanese translation of PCT international applications Nos. 8-511812, 10-508048 and 2000-511296, for example.

A polyimide-based polymer used for a forming material of an optical film of the present invention contains the repeating unit represented by the following general formula (II) in the molecule, for example.

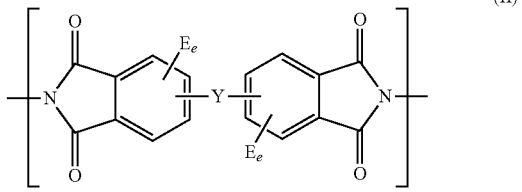

Here, in the formula (II), Y denotes a covalent bond or an atom or a group selected from the group consisting of a $CH_2$ group, a $C(CH_3)_2$ group, a $C(CZ_3)_2$ group (herein, Z is halogen), a CO group, an O atom, an S atom, an $SO_2$ group, an $Si(CH_2CH_3)_2$ group, and an $N(CH_3)$ group. E is a substituent and e denotes substitution number (an integer of 0 to 3) of E. E is halogen, an alkyl group with a carbon number of 1 to 3, a halogenated alkyl group with a carbon number of 1 to 3, a phenyl group, or a substituted phenyl group, and when there are a plurality of Es, each of Es is the same or different. As the substituted phenyl group, a phenyl group having at least one kind of substituent selected from the group consisting of halogen, an alkyl group with a carbon number of 1 to 3, and a halogenated alkyl group with a carbon number of 1 to 3 may be cited, for example. Also, as the halogen, fluorine, chlorine, bromine, or iodine may be cited, for example.

Among the polyimide-based polymer having the repeating unit represented by the above-mentioned formula (II), the polyimide-based polymer having the repeating unit represented by the following formula (VI) is preferable, since the polyimide-based polymer is excellent in transparency.

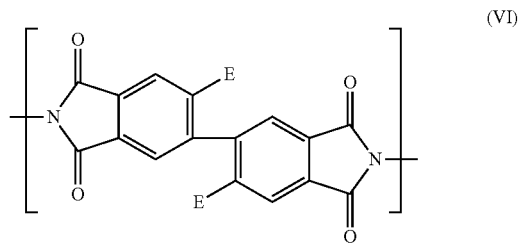

In the formula (VI), E denotes halogen, an alkyl group with a carbon number of 1 to 3, a halogenated alkyl group with a carbon number of 1 to 3, a phenyl group, or a substituted phenyl group. Preferably, E is halogen such as chlorine or the like.

Also, the above-mentioned polyimide-based polymer is preferably a polymer further containing the repeating unit represented by the following general formula (III) in the molecule.

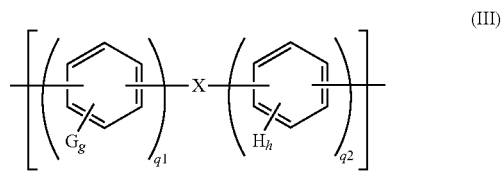

In the general formula (III), X denotes a covalent bond, or an atom or a group selected from the group consisting of a $CH_2$ group, a $C(CH_3)_2$ group, a $C(CZ_3)_2$ group (herein, Z is halogen), a CO group, an O atom, an S atom, an $SO_2$ group, an $Si(CH_2CH_3)_2$ group, and an $N(CH_3)$ group. G and H are a substituent, g denotes substitution number (an integer of 0 to 4) of G, and h denotes substitution number (an integer of 0 to 4) of H. G and H each identically or differently denote an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group, and a substituted alkyl ester group, and when there are a plurality of G and H, each of G and H is the same or different. Also, q1 denotes an integer of 0 to 3 and q2 denotes an integer of 1 to 3. As the halogen, fluorine, chlorine, bromine, or iodine may be cited, for example. As the substituted alkyl group, a halogenated alkyl group may be cited, for example. Also, as the substituted aryl group, a halogenated aryl group may be cited, for example.

Among the polyimide-based polymer having the repeating unit represented by the above-mentioned formula (III), the polyimide-based polymer having the repeating unit represented by the following formula (VII) is preferable.

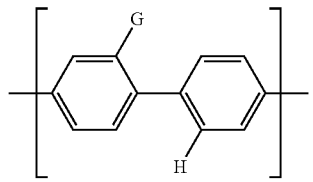
(VII)

In the formula (VII), G and H each identically or differently denote an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group, and a substituted alkyl ester group. Preferably, G and H are an atom or a group except hydrogen, and more preferably, a substituted alkyl group such as a halogenated alkyl group ($CF_3$ or the like).

Also, the above-mentioned polyimide-based polymer may be a polymer containing the repeating unit represented by the following general formula (VIII) in the molecule in place of or in combination with the repeating unit represented by the above-mentioned formula (II).

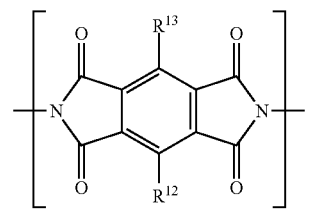
(VIII)

In the formula (VIII), $R^{12}$ and $R^{13}$ each denote an atom or a group selected from the group consisting of hydrogen, halogen, a phenyl group, a substituted phenyl group, an alkyl group, and a substituted alkyl group. Preferably, $R^{12}$ and $R^{13}$ each independently denote a halogenated alkyl group.

The preferable polyimide-based polymer of the present invention has the repeating unit represented by the above-mentioned formula (I) and at least one of the repeating unit selected from the above-mentioned formula (II) to (VIII) in the molecule. Of these, the preferable example of constitution of the polyimide-based polymer is represented by the following general formula (V).

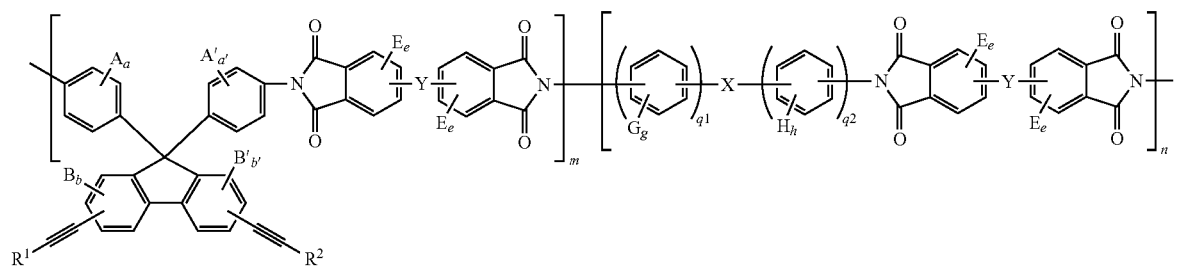
(V)

In the formula (V), Aa, A'a', Bb and B'b', as well as $R^1$ and $R^2$ are the same as the formula (I). Ee and Y are the same as the formula (II). Gg, Hh, X, q1, and q2 are the same as the formula (III). Also, m denotes 1 to 90% by mol, and n denotes 10 to 70% by mol. Here, m+n≦100% by mol when the whole polymer is expressed as 100% by mol.

Also, among the polymer represented by the formula (V), the polyimide-based polymer represented by the following general formula (IX) is preferable.

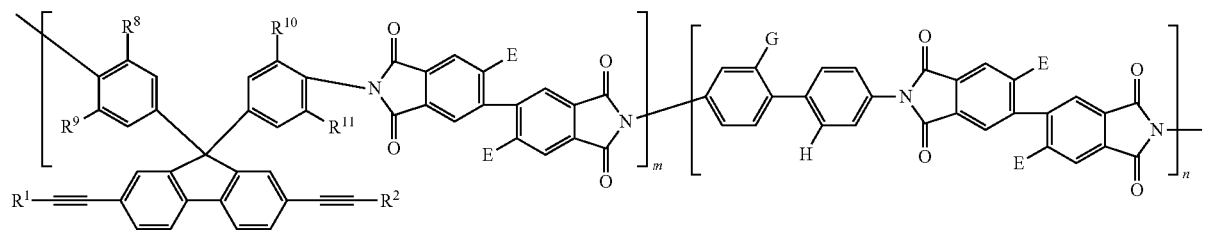
(IX)

In the formula (IX), $R^8$ to $R^{11}$, $R^1$ and $R^2$ are the same as the formula (IV), G and H are the same as the formula (VII), and E is the same as the formula (VI). Also, m denotes 1 to 90% by mol, and n denotes 10 to 70% by mol. Here, m+n≦100% by mol.

The weight-average molecular weight (Mw) of the polymer of the present invention is not particularly limited, but preferably in the range of 1,000 to 1,000,000, and more preferably from 2,000 to 500,000. The reason therefor is that when the polymer in which the weight-average molecular weight thereof is within the above-mentioned range is shaped into a film, sufficient strength is obtained, cracks due to expansion and contraction and distortion are caused with difficulty, and favorable solubility in a solvent is obtained.

Also, a glass transition temperature of the polymer of the present invention depends on the formula (I), variety of the main chain, and the introduction amount of the each repeating unit. The glass transition temperature of the polymer of the present invention is preferably 100° C. or more, and more preferably 130° C. or more. The polymer having the glass transition temperature in the above range has sufficient heat resistance as an optical film. Here, the glass transition temperature can be determined by a DSC method according to JIS K 7121 (1987).

The polymer having the repeating unit represented by the above-mentioned formula (I) can be obtained by introducing into diethynylfluorene represented by the following general formula (X) as the repeating unit.

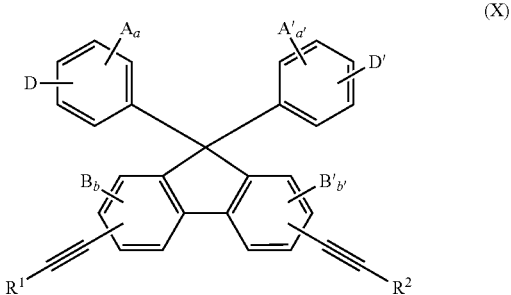

Here, in the formula (X), A, A', B and B' each denote a substituent, a and a' denote substitution number (an integer of 0 to 4) of the corresponding A and A', and b and b' denote substitution number (an integer of 0 to 3) of the corresponding B and B'. A, A', B and B' each independently denote halogen or an alkyl group with a carbon number of 1 to 4. $R^1$ and $R^2$ each independently denote hydrogen, halogen, an alkyl group with a carbon number of 1 to 10, a substituted or unsubstituted aryl group, a substituted or unsubstituted vinyl group, a substituted or unsubstituted ethynyl group, $SiR^3R^4R^5$ ($R^3$ to $R^5$ are each an alkyl group with a carbon number of 1 to 6 or an aryl group), or $CR^6R^7(OH)$ ($R^6$ and $R^7$ are each an alkyl group with a carbon number of 1 to 4). D and D' each independently denote an OH group, an NHR group (wherein this R denotes hydrogen or an alkyl group with a carbon number of 1 to 4), a COOH group, or an NCO group.

Among the diethynylfluorene represented by the above-mentioned formula (X), diethynylfluorene represented by the following general formula (XI) is preferable.

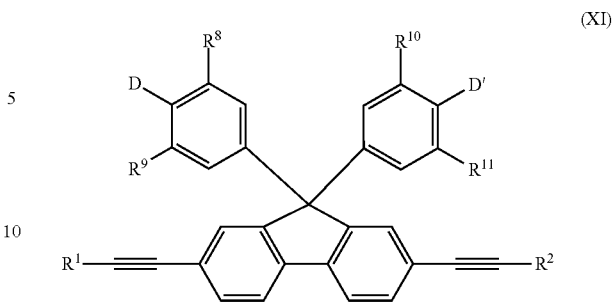

Here, in the formula (X1), $R^8$ to $R^{11}$ each independently denote hydrogen or a methyl group, and $R^1$, $R^2$, D and D' are the same as the formula (X).

In the diethynylfluorene represented by the formula (XI), preferably, the $R^8$ and $R^{10}$ each are a methyl group, and the $R^9$ and $R^{11}$ each are hydrogen.

Also, in the diethynylfluorene represented by the formula (X) and the formula (XI), preferably, the $R^1$ and $R^2$ are each independently hydrogen, an alkyl group with a carbon number of 1 to 6, a trimethylsilyl group, or a $C(CH_3)_2(OH)$ group.

Further, the above-mentioned D and D' are substituents for bonding to another repeating unit. In the formulae (X) and (XI), the D and D' are preferably an $NH_2$ group by reason of being capable of reacting with acid to easily form an imide bond, for example.

The above-mentioned diethynylfluorene is introduced into the polymer as the repeating unit in such a manner as described in the general formula (I). The diethynylfluorene of the present invention is introduced into the polymer exhibiting the normal dispersion (the polymer whose wavelength dispersion exhibits the normal dispersion in original property), so that the optical property of the polymer is improved and the wavelength dispersion of the polymer approaches the flat dispersion. Accordingly, the diethynylfluorene itself of the present invention exhibits the inverse dispersion and has the function of approximating the wavelength dispersion of the polymer to the flat dispersion by being introduced into the polymer exhibiting the normal dispersion.

This function corresponds to the introduction amount of the diethynylfluorene and the wavelength dispersion approaches the flat dispersion according as the introduction amount is increased.

Accordingly, the present invention provides a retardation adjustment method of an optical film for adjusting the retardation of an optical film containing the polymer such as polyimide by introducing the diethynylfluorene represented by the above-mentioned formula (X) or (XI) into the polymer such as polyimide. According to such an adjustment method, the adjustment of the introduction amount of diethynylfluorene into polyimide allows an optional optical film to be produced ranging from an optical film close to the flat dispersion to an optical film approximately exhibiting the flat dispersion.

As the diethynylfluorene, for example, fluorene having an ethynyl group; fluorene having a halogenated ethynyl group; fluorene having an alkylethynyl group; fluorene having an arylethynyl group such as a phenylethynyl group, a biphenylethynyl group, a naphthylethynyl group, an anthrylethynyl group, or a phenanthrylethynyl group; and fluorene having a trialkylsilylethynyl group such as a trimethylsilylethnyl group may be cited.

As specific examples of fluorene having an ethynyl group, 9,9-bis(3-methyl-4-aminophenyl)-2,7-bis(ethynyl)fluorene, 9-9-bis(3-methyl-4-aminophenyl)-2,7-diethynylfluorene, 9,9-bis(4-aminophenyl)-2,7-diethynylfluorene, and the like may be cited.

As specific examples of fluorene having a halogenated ethynyl group, 9,9-bis(4-aminophenyl)-2,7-dichloroethynylfluorene, 9,9-bis(4-aminophenyl)-2,7-dibromoethynylfluorene, 9,9-bis(4-aminophenyl)-2,7-diiodoethynylfluorene, and the like may be cited.

As specific examples of fluorene having an alkylethynyl group, 9,9-bis(4-aminophenyl)-2,7-dihexynylethynylfluorene, 9,9-bis(4-aminophenyl)-2,7-dipentanylethynylfluorene, 9,9-bis(4-aminophenyl)-2,7-diheptanylethynylfluorene, and the like may be cited.

As specific examples of fluorene having an arylethynyl group, 9,9-bis(4-aminophenyl)-2,7-bis(phenylethynyl)fluorene, and the like may be cited.

As specific examples of fluorene having a trialkylsilylethynyl group, 9,9-bis(3-methyl-4-aminophenyl)-2,7-bis(trimethylsilylethynyl)fluorene, 9,9-bis(4-aminophenyl)-2,7-bis(trimethylsilylethynyl)fluorene, 9,9-bis(4-aminophenyl)-2,7-bis(triethylsilylethynyl)fluorene, 9,9-bis(4-aminophenyl)-2,7-bis(t-butyldimethylsilylethynyl)fluorene, and the like may be cited.

As other diethynylfluorene, 9,9-bis(3-methyl-4-aminophenyl)-2,7-bis(2-hydroxy-2-methyl-3-butynyl)fluorene, and the like may be cited.

Each of the above-mentioned diethynylfluorene may be produced by the following method, for example.

For example, 2,7-dibromofluorene is reacted with an aniline derivative under the presence of an acid catalyst. Diethynylfluorene having an amino group may be obtained by reacting the intermediate obtained by the above-mentioned reaction with an ethynyl compound under the presence of a palladium (0) catalyst (reaction formula A).

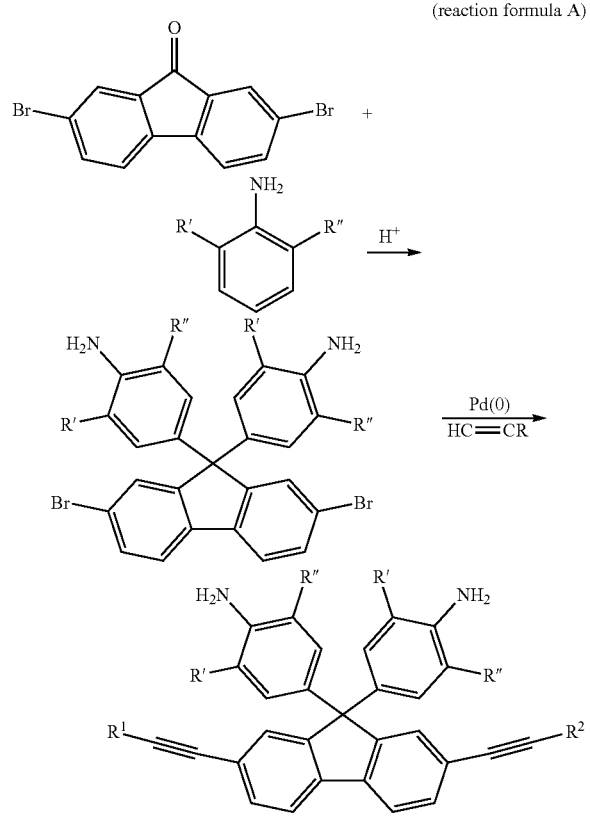

(reaction formula A)

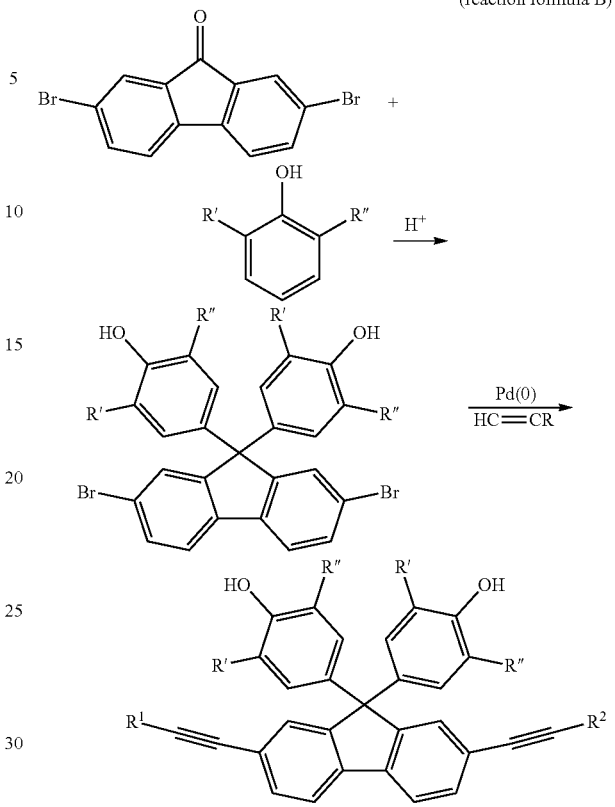

(reaction formula B)

Further, diethynylfluorene having a hydroxyl group may be obtained by replacing the above-mentioned aniline derivative with a phenol derivative (reaction formula B).

The polyimide-based polymer having the repeating unit of the above-mentioned formula (I) may be obtained by reacting diethynylfluorene exemplified above, acid dianhydride and diamine. Specifically, diethynylfluorene, acid dianhydride and diamine are mixed at predetermined molar ratio while dissolved in a proper solvent, and thereafter stirred at room temperature for predetermined time to produce polyamic acid. Next, acetic anhydride and pyridine are added thereto and heated as required to imidize the polyamic acid while stirred. The obtained polyimide is cooled to room temperature and purified with a proper solvent. The polymer of the present invention may be obtained by washing and drying the purified product.

As the acid dianhydride, for example, aromatic tetracarboxylic dianhydride may be cited. As the aromatic tetracarboxylic dianhydride, for example, pyromellitic dianhydride, benzophenonetetracarboxylic dianhydride, naphthalene tetracarboxylic dianhydride, heterocyclic aromatic tetracarboxylic dianhydride, 2,2'-substituted biphenyltetracarboxylic dianhydride, and the like may be cited. As the pyromellitic dianhydride, for example, pyromellitic dianhydride, 3,6-diphenylpyromellitic dianhydride, 3,6-bis(trifluoromethyl) pyromellitic dianhydride, 3,6-dibromopyromellitic dianhydride, 3,6-dichloropyromellitic dianhydride, and the like may be cited. As the benzophenonetetracarboxylic dianhydride, for example, 3,3',4,4'-benzophenonetetracarboxylic dianhydride, 2,3,3',4'-benzophenonetetracarboxylic dianhydride, 2,2',3,3'-benzophenonetetracarboxylic dianhydride, and the like may be cited. As the naphthalene tetracarboxylic dianhydride, for example, 2,3,6,7-naphthalene-tetracarboxylic dianhydride, 1,2,5,6-naphthalene-tetracarboxylic dianhydride, 2,6-dichloro-naphthalene-1,4,5,8-tetracarboxylic dianhydride, and the like may be cited. As the heterocyclic aromatic tetracarboxylic dianhydride, for example, thiophene-2,3,4,5-tetracarboxylic dianhydride, pyrazine-2,3,5,6-tetracarboxylic dianhydride, pyridine-2,3,5,6-tetracarboxylic dianhydride, and the like may be cited. As the 2,2'-substituted biphenyltetracarboxylic dianhydride, for example, 2,2'-dibromo-4,4',5,5'-biphenyltetracarboxylic dianhydride, 2,2'-dichloro-4,4',5,5'-biphenyltetracarboxylic dianhydride, 2,2'-bis(trifluoromethyl)-4,4',5,5'-biphenyltetracarboxylic dianhydride, and the like may be cited.

Further, as other examples of the aromatic tetracarboxylic dianhydride, for example, 3,3',4,4'-biphenyltetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-bis(3,4-dicarboxyphenyl)-2,2-diphenylpropane dianhydride, bis(3,4-dicarboxyphenyl) ether dianhydride, 4,4'-oxydiphthalic dianhydride, bis(3,4-dicarboxyphenyl)sulfonic dianhydride, 3,3',4,4'-diphenylsulfone tetracarboxylic dianhydride, 4,4'-[4,4'-isopropylidene-di(p-phenyleneoxy)]bis(phthalic anhydride), N,N-(3,4-dicarboxyphenyl)-N-methylamine dianhydride, bis(3,4-dicarboxyphenyl)diethylsilane dianhydride, and the like may be cited.

Among them, as for the aromatic tetracarboxylic dianhydride, substituted biphenyl tetracarboxylic dianhydride is preferable, and 1,1'-dichloro-3,3',4,4'-biphenyl tetracarboxylic dianhydride is more preferable.

As the diamine, for example, aromatic diamine may be cited. As specific examples of the diamine, for example, benzene diamine, diaminobenzophenone, naphthalenediamine, heterocyclic aromatic diamine, and other aromatic diamine may be cited.

As the benzenediamine, for example, diamines selected from the group consisting of benzene diamines such as o-, m- or p-phenylenediamine, 2,4-diaminotoluene, 1,4-diamino-2-methoxybenzene, 1,4-diamino-2-phenylbenzene and 1,3-diamino-4-chlorobenzene may be cited. As the diaminobenzophenone, for example, 2,2'-diaminobenzophenone and 3,3'-diaminobenzophenone may be cited. As the naphthalenediamine, for example, 1,8-diaminonaphthalene and 1,5-diaminonaphthalene may be cited. As the heterocyclic aromatic diamine, for example, 2,6-diaminopyridine, 2,4-diaminopyridine, and 2,4-diamino-5-triazine may be cited.

In addition, as other examples of the aromatic diamine, for example, 4,4'-diaminobiphenyl, 4,4'-diaminodiphenylmethane, 4,4'-(9-fluorenylidene)-dianiline, 2,2'-bis(trifluoromethyl)-4,4'-diaminobiphenyl, 3,3'-dichloro-4,4'-diaminodiphenylmethane, 2,2'-dichloro-4,4'-diaminobiphenyl, 2,2',5,5'-tetrachlorobenzidine, 2,2-bis(4-aminophenoxyphenyl) propane, 2,2-bis(4-aminophenyl)propane, 2,2-bis(4-aminophenyl)-1,1,1,3,3,3-hexafluoropropane, 4,4'-diaminodiphenyl ether, 3,4'-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, and 4,4'-diaminodiphenyl sulfone may be cited.

Among them, as for the diamine, 2,2'-bis(trifluoromethyl)-4,4'-diaminobiphenyl, and the like is preferable.

The optical film of the present invention may be obtained by forming a forming material containing the polymer of the present invention into a film.

Here, as for a forming material of the optical film, the polymer of the present invention may be added another polymer having different constitution as far as an aligning property thereof is not deteriorated. As examples of another polymer, for example, various general-purpose resins, engineering plastics, thermoplastic resins, and thermosetting resins may be cited. As the general-purpose resins, for example, polyethylene, polypropylene, polystyrene, polymethyl methacrylate, acrylonitrile-butadiene-styrene resins, acrylonitrile-styrene resins may be cited. As the engineering plastics, for example, polyacetate, polycarbonate, polyamide (nylon), polyethylene terephthalate, and polybutylene terephthalate may be cited. As the thermoplastic resins, for example, polyphenylene sulfide, polyethersulfone, polyketone, polyimide, polycyclohexane dimethanol terephthalate, polyarylate, and liquid crystal polymers may be cited. As the thermosetting resins, for example, epoxy resins and phenol novolac resins may be cited. When these polymers used for mixing is mixed in the polymer of the present invention, a blending quantity of these polymers is, for example, from 0 to 50% by mass, and preferably from 0 to 30% by mass.

Also, the forming material may be added various kinds of additives such as a stabilizer, a plasticizer, and an additives containing metals, as required.

The thickness of the optical film of the present invention is not particularly limited, but generally 200 μm or less. Particularly, the thickness of the optical film is preferably 20 μm or less, more preferably 15 μm or less, and particularly preferably 10 μm or less, for the reason that thinning an image display device can be achieved. On the other hand, lower limit of the thickness of the optical film may be set arbitrary corresponding to a retardation value of a compensation object, but generally 1 μm or more, and preferably 2 μm or more. The polymer of the present invention exhibits optical uniaxial by coating, so that the polymer may be formed thin film as described above.

The producing method for the optical film of the present invention is not particularly limited and, for example, the optical film may be produced by forming the above-mentioned forming material into a film and drawing (or contracting) as required. The polymer of the present invention may also be dissolved in a proper solvent and formed into a film by reason of being excellent in solvent solubility.

In particular, the polyimide-based polymer of the present invention may be formed into a coating film exhibiting negative uniaxial (nx≅ny>nz) by coating the forming material containing the polymer on a base material. That is, the polyimide-based polymer of the present invention exhibits optical uniaxial by coating on a base material regardless of the presence or absence of the alignment of the base material.

Examples of the coating method for the above-mentioned forming material include a method for coating the forming material by heating to dissolve, a method for coating polymer solution in which the forming material is dissolved in a solvent and the like. The above-mentioned method for coating polymer solution is preferable in view of production efficiency, molecular alignment control and optical anisotropy control.

The solvent is not particularly limited as far as the solvent can dissolve the polymer of the present invention and arbitrary selected. As specific examples of the solvent, for example, halogenated hydrocarbons such as chloroform, dichloromethane, carbon tetrachloride, dichloroethane, tetrachloroethane, trichloroethylene, tetrachloroethylene, chlorobenzene, and ortho-dichlorobenzene; phenols such as phenol, and para-chlorophenol; aromatic hydrocarbons such as benzene, toluene, xylene, methoxybenzene, and 1,2- dimethoxybenzene; ketone-based solvents such as acetone, methyl ethyl ketone, methyl isobutyl ketone, cyclohexanone, cyclopentanone, 2-pyrrolidone, and N-methyl-2-pyrrolidone; ester-based solvents such as ethyl acetate, and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amide-based solvents such as dimethylformamide, and dimethylacetoamide; nitrile-based solvents such as acetonitrile, and butyronitrile; ether-based solvent such as diethyl ether, dibutyl ether, and tetrahydrofurane; carbon disulfide; cellosolves such as ethylcellosolve and butylcellosolve; and the like may be cited. These solvents may be used alone or in the form of a mixture of two or more thereof.

The polymer solution may be blended in the range of 5 to 50 parts by mass, and more preferably from 10 to 40 parts by mass with respect to 100 parts by mass of the solvent, for the reason that the polymer solution may have appropriate viscosity for coating.

Also, arbitrary coating method such as a spin coating method, a roll coating method, a flow coating method, a print method, a dip coating method, a coating film-forming method, a bar coating method, a gravure printing method, and the like may be cited.

The coating film on a base material may be dried after coating the polymer solution. The drying is performed by natural drying, air drying, drying by heating, and the like, for example. When the drying by heating is adopted, heating temperature is not particularly limited, but from 25 to 250° C., and preferably from 40 to 200° C.

The solvent amount remaining in the film finally obtained is preferably adjusted to 1% by mass or less, more preferably 0.5% by mass or less by drying treatment. The reason therefor is that the film with a small remaining solvent amount is so excellent in dimensional stability that the change of optical property with time is caused with difficulty.

The base material to be coated with the above-mentioned forming material is not particularly limited, but may be a base material made of a synthetic resin or a base material made of an inorganic compound such as a glass base material and a silicon wafer. As examples of the base material made of a synthetic resin, a film base material produced by the cast method; a film base material produced in such a manner that a molten polymer is formed into a film and thereafter subjected to drawing treatment; and the like may be cited. Among these, a film base material with mechanical strength increased by performing drawing treatment is preferable, for the reason that the forming material can be coated accurately.

Further, a base material excellent in transparency is preferably used. The use of the base material excellent in transparency allows an optical film formed on the base material to be used directly as an optical member without being peeled off the base material.

As the base material, for example, acetate resins (for example, triacetyl cellulose and the like), polyester resins, polyethersulfone resins, polysulfone resins, polycarbonate resins, polyamide resins, polyimide resins, polyolefin resins, acrylic resins, polynorbornene resins, cellulose resins, polyarylate resins, polystyrene resins, polyvinyl alcohol resins, polyvinyl chloride resins, polyvinylidene chloride resins, polyacrylic resins, mixtures thereof, and the like may be cited. Also, liquid crystal polymers may be used. Further, a mixture of a thermoplastic resin having a substituted imide group or a non-substituted imide group on the side chain and a thermoplastic resin having a substituted phenyl group or a non-substituted phenyl group and a nitrile group on the side chain may be formed into film and used as a base material. These films are described in Japanese Unexamined Patent Publication No. 2001-343529.

The thickness of the base material is, for example, 12 μm or more and 200 μm or less, preferably 20 μm or more and 150 μm or less, and more preferably 25 μm or more and 100 μm or less. In the case where the base material has a thickness of 12 μm or more, the polymer may be coated further accurately. In the case where the base material has a thickness of 200 μm or less, distortion amount of the film may be further restricted when the film is mounted on a liquid crystal panel.

As described above, the forming material containing the polyimide-based polymer of the present invention can be formed into coating film exhibiting optical uniaxial by coating the forming material on the base material. A thin retardation film exhibiting optically uniaxial ($nx \equiv ny > nz$) is provided by using this coating film as the optical film of the present invention.

Further, a biaxial optical film exhibiting $nx > ny > nz$ may be formed by drawing or contracting this coating film.

As a drawing method of the coating film, for example, a free-end longitudinal stretching method of uniaxially stretching in a longitudinal direction of the film, a fixed-end transverse stretching method of uniaxially stretching in a width direction with the film fixed in a longitudinal direction may be preferably cited. Also, a biaxial stretching method of sequential or simultaneous stretching in both a longitudinal direction and a width direction may be cited as the drawing method, for example. In the case where the base material with the coating film is formed on is a base material, which can be drawn, the coating film is preferably drawn by drawing the base material. According to this drawing method, the base material can be drawn uniformly, thus the coating film can be drawn indirectly and uniformly corresponding to the drawing of the base material. Also, this drawing method is applicable to continuous production process and preferable in terms of improving mass productivity of products. Here, the base material and the coating film may be drawn concurrently.

Further, in the case where the base material on which the coating film is formed is a contractable base material, the contraction of the base material allows the contraction of the coating film to be indirectly performed. On this occasion, the contraction percentage is preferably controlled by utilizing a drawing machine or the like. As examples of the control method, a method for temporarily releasing a clip of a drawing machine to relax in the transfer direction of the above-mentioned base material, a method for gradually narrowing the interval of a clip of a drawing machine, and the like may be cited.

As for the optical film of the present invention, control of the retardation value in the thickness direction Rth and the in-plane retardation value Re may be performed by adjusting constitution and molecular weight of the polymer material which is used for or adjusting thickness or drawing (or construction) ratio of the optical film, for example.

The wavelength dispersion of the optical film containing the polymer having the repeating unit represented by the above-mentioned formula (I) approaches flatness. Specifically, the optical film of the present invention satisfies the relation of $0.97 \leq Rth(450)/Rth(550) \leq 1.06$ and $1.03 \geq Rth(650)/Rth(550) \geq 0.95$.

Particularly, in the polymer of the present invention, the formed optical film exhibits wavelength dispersion which further approaches the flat dispersion such that the relation of $0.97 \leq Rth(450)/Rth(550) \leq 1.03$ and $0.97 \leq Rth(450)/Rth(550) \leq 1.02$ is satisfied by increasing the introduction amount of the formula (I).

In the same way, by increasing the introduction amount of the formula (I), the formed optical film exhibits wavelength dispersion which further approaches the flat dispersion such that the relation of $1.03 \geqq Rth(650)/Rth(550) \geqq 0.97$ and $1.03 \geqq Rth(650)/Rth(550) \geqq 0.98$ is satisfied.

The film formed by a conventionally known polyimide-based polymer exhibits wavelength dispersion such that a retardation value is larger on the shorter wavelength side. Specifically, the film formed by a conventionally known polyimide-based polymer generally exhibits the relation of about $Rth(450)/Rth(550) > 1.06$ and $Rth(650)/Rth(550) < 0.95$. The same holds true for polyimide into which a fluorene skeleton is introduced as a repeating unit. The wavelength dispersion of the optical film of the present invention can approach the flat dispersion when a polymer into which a fluorene skeleton having a triple bond group is introduced is used. This knowledge is first obtained by the inventors of the present invention.

Also, in the case where the optical film of the present invention exhibits the relation of nx>ny>nz, the in-plane retardation value of the optical film satisfies the relation of $Re(450)/Re(550) \leqq 1.06$, $Re(650)/Re(550) \geqq 0.95$ and wavelength dispersion exhibits such that the in-plane retardation value further approaches the flat dispersion by increasing the introduction amount of the formula (I).

In addition, Rth(450), Rth(550) and Rth(650) denote the retardation value in the thickness direction at a wavelength of 450 nm, 550 nm, and 650 nm. The retardation value in the thickness direction is calculated by $Rth(\lambda)=(nx-nz) \times d$.

Re(450), Re(550) and Re(650) denote the in-plane retardation value at a wavelength of 450 nm, 550 nm, and 650 nm. The in-plane retardation value is calculated by $Re(\lambda)=(nx-ny) \times d$.

Here, nx denotes a refractive index in the X-axis direction in a film plane, ny denotes a refractive index in the Y-axis direction in a film plane, nz denotes a refractive index in the direction orthogonal to the X-axis direction and the Y-axis direction, and d denotes the thickness (nm) of the film. The X-axis direction is a direction in which a refractive index in a film plane becomes the maximum and the Y-axis direction is a direction in which orthogonal to the X-axis direction in the same plane.

The refractive index of the optical film of the present invention can be set appropriately by the introduction amount of the formula (I), constitution of polyimide, and the like. The refractive index ($\Delta nxz(550)=nx-nz$) of the optical film of the present invention at a wavelength of 550 nm is preferably 0.01 or more, more preferably from 0.015 to 0.070, and particularly preferably from 0.020 to 0.055.

The optical film of the present invention is used for arbitrary appropriate applications. As typical applications of the optical film of the present invention, for example, a retardation film such as a λ/4 plate, a λ/2 plate, and a viewing angle expansion film which are used for a liquid crystal display device may be cited. Also, the optical film of the present invention is used for an antireflection film mounted on an image display device such as a liquid crystal display device, an organic light emitting display, a plasma display, and the like.

The optical film of the present invention can be used as form of an optical laminated body in which other optical member is laminated. As the optical laminated body, for example, a laminated body (polarizing plate) in which the optical film of the present invention and a polarizer having a protective layer are laminated and a laminated body in which the optical film of the present invention and other retardation film are laminated may be cited.

The optical film and the like which compose these laminated bodies are generally laminated and adhered by well-known adhesives (or pressure sensitive adhesives). As the adhesives (or pressure sensitive adhesives), for example, a solvent adhesive, an emulsion adhesive, a pressure sensitive adhesive, a rewet adhesive, a polycondensation adhesive, a solventless adhesive, a film form adhesive, a hot-melt adhesive, and the like may be cited.

A properly and appropriate polarizer is adopted as far as the polarizer is an optical element which can convert a natural light or a polarized light into a linear polarized light. The polarizer is preferably a drawn film containing a vinyl alcohol-based polymer including iodine or a dichroic dye as a main component. The thickness of the polarizer is generally from 5 μm to 50 μm. The protective layer is used for preventing constriction or expansion of the polarizer. Also, the protective layer is used for preventing degradation of the polarizer by the ultraviolet rays. As the protective layer, a polymer film containing a cellulose-based polymer or a norbornene-based polymer is preferably used. The thickness of the protective layer is generally from 10 μm to 200 μm. Here, the protective layer may combine with a base material when the optical film of the present invention is formed.

Various display devices are adopted as the image display device of the present invention under the condition that the optical film of the present invention is used.

The image display device of the present invention is used for proper and appropriate applications. When the application is a liquid crystal display device, for example, office automation equipments such as a personal computer monitor, a notebook computer and a copying machine, portable equipments such as a portable telephone, a watch, a digital camera, a personal digital assistant (PDA), and a portable game machine, domestic electrical equipments such as a video camera and a microwave oven, on-vehicle equipments such as a back monitor, a monitor for a car navigation system, and a car audio, display equipments such as an information monitor for a commercial store, security equipments such as an observation monitor, and care/medical equipments such as a care monitor and a medical monitor may be cited as applications.

The image display device of the present invention includes a liquid crystal display device, an organic light emitting display, a plasma display, and the like. The preferable application of the image display device is a TV set. The screen size of the TV set is preferably wide 17 type (373 mm×224 mm) or more, more preferably wide 23 type (499 mm×300 mm) or more, and particularly preferably wide 32 type (687 mm×412 mm) or more.

The polymer containing the polyimide-based polymer of the present invention is appropriate as the above-mentioned forming material for an optical film, for the reason that the polymer is excellent in transparency and heat resistance, and exhibits predetermined retardation.

Further, the polymer of the present invention may be used as the forming material for various kinds of optical members such as a plastic lens, a prism, an optical disc, an optical fiber, a photoresist, and a hologram, except for an optical film.

Also, the polymer of the present invention may be used for such as an electrolyte film for a fuel cell, a coating material for a semiconductor (such as a chip surface protective material, a chip interlayer insulating material, and the like), a sealing material for a semiconductor device, a material for a flexible circuit board, a material for a photo-alignment film, an optical waveguide material, a cosmic ray-proof material (usable for an artificial satellite or the like), a material for a separation film (for gas separation or the like), a resist material, and a material for a printer (a toner transfer belt for a color printer or the like).

In addition, the polymer of the present invention may be used as a coating agent for protecting a member surface, for the reason that the polymer is excellent in solvent solubility.

EXAMPLES

Next, the present invention is described in detail with reference to examples of the present invention. However, the present invention is not limited to the following examples.

Here, each analytical method used in examples is as follows.
(Measurement of Chemical Constitution)

The chemical constitution was measured by using a nuclear magnetic resonance spectrometer [product name: AVANCEII300, manufacture by Bruker Japan Co., Ltd.] (measurement solvent; deuterated chloroform or deuterated DMSO, frequency; 300 MHz, observation nucleus; $^1$H, $^{13}$C, measured temperature; 25° C.).
(Measurement of Infrared Absorption Spectrum)

The infrared absorption spectrum was measured by using an infrared spectral photometer [product name: FT/IR-470plus, manufactured by JASCO Corporation.].
(Measurement of Glass Transition Temperature)

The glass transition temperature was measured by using a differential scanning calorimeter [trade name: DSC-6200, manufactured by Seiko Instruments Inc.] by a method according to JIS K 7121 (1987) (method of measuring a transition temperature of plastics). Specifically, 3 mg of a powder sample was heated (heating speed; 10° C./min) under nitrogen atmosphere (flow rate of gas; 50 ml/min) to raise the temperature of the sample, thereby measuring the temperature twice to adopt the second data. The temperature of the calorimeter was calibrated by using a standard material (indium).
(Measurement of Molecular Weight)

Each sample was prepared to 0.1%-DMF solution and filtered through a 0.45-μm membrane filter to thereafter measure weight-average molecular weight by using a HLC-8120GPC manufactured by Tosoh Corporation as the GPC itself and using RI (incorporated into the GPC itself as a detector. Specifically, the column temperature was 40° C. and the pump flow rate was 0.40 mL/minute, and with regard to the data processing, the molecular weight was obtained from the molecular weight converted into polyethylene oxide by using the calibration curve of standard polyethylene oxide with the molecular weight thereof known previously. Here, the used column was such that super AWM-H (diameter 6.0 mm×15 cm), super AW4000 (diameter 6.0 mm×15 cm) and super AW2500 (diameter 6.0 mm×15 cm) were connected in series. The used mobile phase was such that 10 mmol LiBr and 10 mmol phosphoric acid were put in a measuring flask to add DMF thereto and determine the total amount at 1 L.
(Measurement of Δnxz, Re(λ) and Rth(λ))

The measurement was performed at a temperature of 23° C. and a wavelength of λ by using a trade name of "KOBRA-WPR" manufactured by Oji Scientific Instruments. Rth(λ) was calculated in such a manner that light with a wavelength of λ was made to enter at an angle of 40° with the sample normal direction to convert the measured value (R40λ) into Rth(λ).
(Measurement of Refractive Index)

The refractive index was measured at a temperature of 23° C. by using an Abbe refractometer (trade name "DR-M4", manufactured by ATAGO Co., Ltd.).

Example 1

Synthesis of Diethynylfluorene 0.43 g of bis(benzonitrile)dichloropalladium (II) and 0.14 g of copper iodide (I) were dissolved in 19 mL of dioxane under nitrogen atmosphere. 4.70 g of tri(t-butylphosphine), 4.54 g of diisopropylamine, 4.41 g of trimethylsilylacetylene and 10.0 g of 2,7-dibromo-9,9-bis(3-methyl-4-aminophenyl)fluorene were added thereto and stirred at room temperature for 24 hours. Thereafter, the solvent was removed under reduced pressure and the residual was purified by a silica gel packed column using a mixed solvent of hexane and ethyl acetate as a developing solvent. In addition, recrystallization was repeated in a mixed solvent of hexane/chloroform=2/1 to thereby obtain 5.30 g of a white compound. When measured by the NMR, the obtained compound was 9,9-bis(3-methyl-4-aminophenyl)-2,7-bis(trimethylsilylethynyl)fluorene represented by the following formula (I).

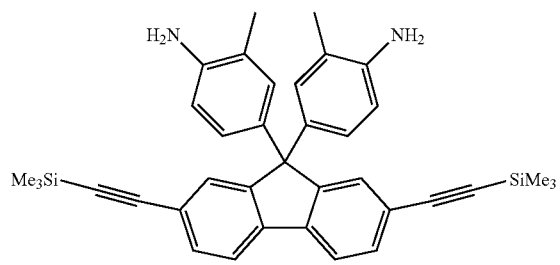

(1)

(Synthesis of Polymer)

0.26 g of 9,9-bis(3-methyl-4-aminophenyl)-2,7-bis(trimethylsilylethynyl)fluorene, 0.43 g of 2,2'-bis(trifluoromethyl)-4,4'-diaminobiphenyl and 0.65 g of 1,1'-dichlorobiphenyl-3,3',4,4'-tetracarboxylic dianhydride were dissolved in 3.11 g of DMAC under nitrogen atmosphere and stirred at room temperature for 7 hours.

Thereafter, 9.0 g of DMAC was added thereto, and 0.34 g of pyridine and 0.44 g of acetic anhydride were further added thereto and stirred for 16 hours.

The obtained reaction solution was dropped into isopropyl alcohol (IPA) to perform reprecipitation. The obtained polymer was filtered and washed with IPA twice to thereby obtain 1.16 g of a white polymer. It was confirmed by the NMR that the composition of the obtained polymer was polyimide represented by the following formula (2) (in which, m:n=26:74, R is C≡C—Si(CH$_3$)$_3$). Here, the weight-average molecular weight of this polymer was 28,100 and the glass transition temperature thereof was 174° C.

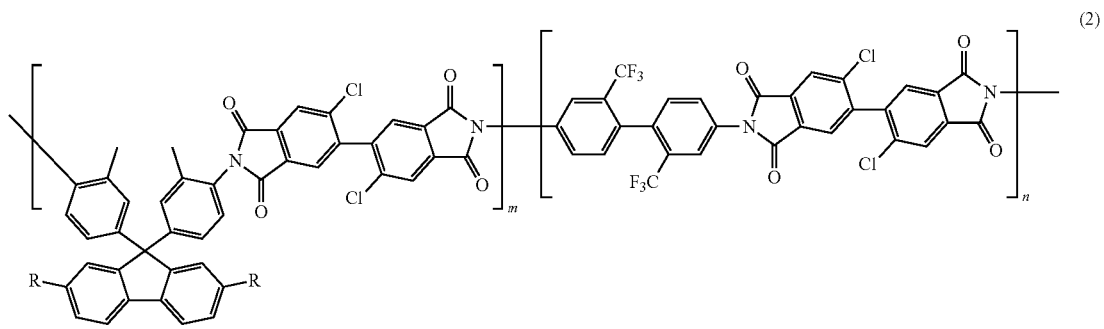

(2)

(Production of Retardation Film)

The obtained polymer was dissolved in cyclohexanone, coated on a glass by the spin coating method, dried at a temperature of 80° C. for 5 minutes, and thereafter further dried at a temperature of 150° C. for 30 minutes to produce a polyimide film. The dry thickness of this film was 5.7 μm (measuring instrument of thickness: Dektak, manufactured by SLOAN).

The birefringence index (Δnxz) of the obtained film in 550 nm was 0.040 (see Table 1).

The wavelength dispersion of retardation in the thickness direction of this film was measured. The results are shown in FIG. 1.

Rth(450)/Rth(550) of Example 1 was 1.05. Here, in Table 1, "$n_d$" denotes refractive index measured by sodium D line (589 nm) (hereinafter, "$n_d$" of each of Example and Comparative Example is the same).

TABLE 1

|  | fluorene introduction amount | $n_d$ | Rth(450)/Rth(550) | Δnxz |
| --- | --- | --- | --- | --- |
| Example 1 | 26 | 1.68 | 1.05 | 0.040 |
| Example 2 | 50 | 1.69 | 1.03 | 0.023 |
| Example 3 | 25 | 1.68 | 1.06 | 0.043 |
| Example 4 | 50 | 1.71 | 1.03 | 0.028 |
| Comparative Example 1 | 26 | 1.68 | 1.07 | 0.041 |
| Comparative Example 2 | 50 | 1.71 | 1.07 | 0.032 |
| Comparative Example 3 | — | 1.67 | 1.07 | 0.075 |

Example 2

The polymer was synthesized by the same method as in the above-mentioned Example 1 except that the additional amount of 9,9-bis(3-methyl-4-aminophenyl)-2,7-bis(trimethylsilylethynyl)fluorene and 2,2'-bis(trifluoromethyl)-4,4'-diaminobiphenyl were changed to 0.51 g and 0.29 g, respectively. Here, the weight-average molecular weight of this polymer was 26,300 and the glass transition temperature thereof was 190° C.

It was confirmed that the composition of the obtained polymer was polyimide represented by the above-mentioned formula (2) (in which, m:n=50:50, R is C≡C—Si(CH$_3$)$_3$).

The obtained polymer was formed into a film in the same manner as in Example 1 (dry thickness: 5.5 μm). Δnxz of the obtained film in 550 nm was 0.023. The wavelength dispersion of retardation in the thickness direction of this film was measured. The results are shown in FIG. 1.

Rth(450)/Rth(550) of Example 2 was 1.03.

Example 3

Synthesis of Diethynylfluorene

Diethynylfluorene was synthesized by the same method as in the synthesis method of 9,9-bis(3-methyl-4-aminophenyl)-2,7-bis(trimethylsilylethynyl)fluorene represented by Example 1 except that trimethylsilylacetylene was replaced with 2-methyl-3-butyne-2-ol. The obtained compound was measured by the NMR and then the compound was 9,9-bis (3-methyl-4-aminophenyl)-2,7-bis(2-hydroxy-2-methyl-3-butynyl)fluorene represented by the following formula (3).

(3)

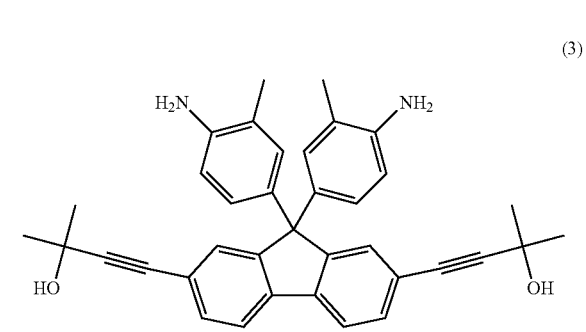

(Synthesis of Polymer)

0.34 g of 9,9-bis(3-methyl-4-aminophenyl)-2,7-bis(2-hydroxy-2-methyl-3-butynyl)fluorene, 0.60 g of 2,2'-bis(trifluoromethyl)-4,4'-diaminobiphenyl and 0.90 g of 1,1'-dichlorobiphenyl-3,3',4,4'-tetracarboxylic dianhydride were dissolvend in 3.11 g of DMAC under nitrogen atmosphere and stirred at room temperature for 7 hours. After that, the polymer was synthesized by the same method as in Example 1. Here, the weight-average molecular weight of the polymer was 23,100 and the glass transition temperature of the polymer was 185° C.

It was confirmed that the composition of the obtained polymer was polyimide represented by the above-mentioned formula (2) (in which, m:n=25:75, R is C≡C—C(CH$_3$)$_2$(OH)).

Figure 2:
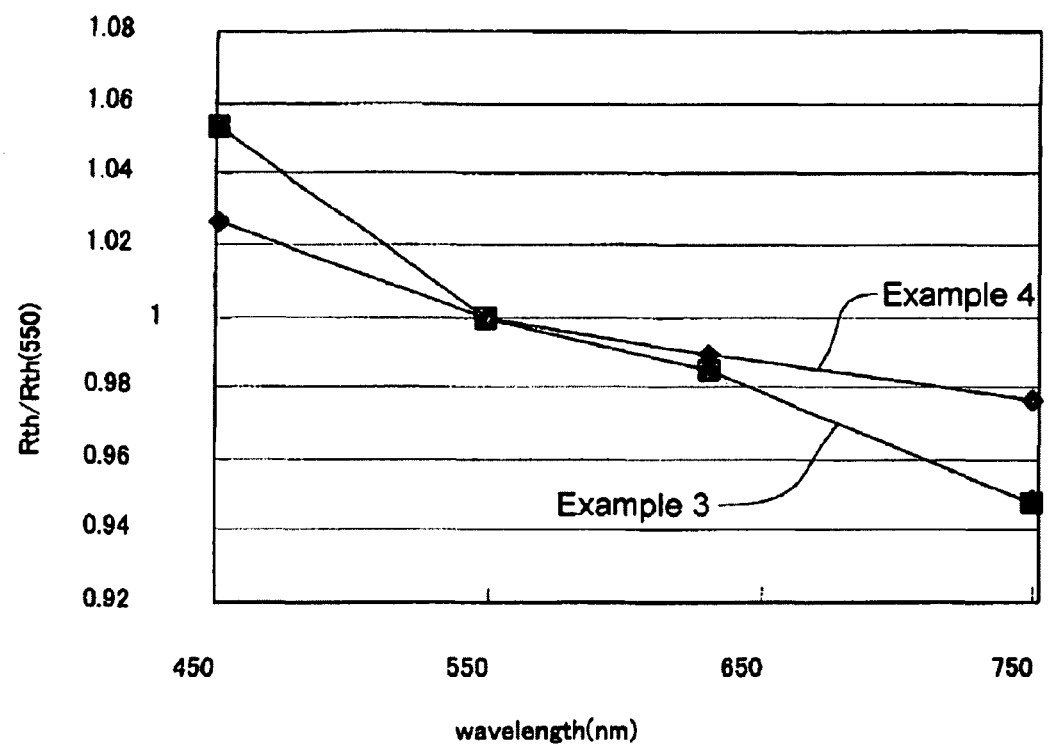
FIG. 2 is a graph view showing the wavelength dispersion of Examples 3 and 4.

The obtained polymer was formed into a film in the same manner as in Example 1 (dry thickness: 5.6 μm). Δnxz of the obtained film in 550 nm was 0.043. The wavelength dispersion of retardation in the thickness direction of this film was measured. The results are shown in FIG. 2. Rth(450)/Rth (550) of Example 3 was 1.06.

Example 4

The polymer was synthesized by the same method as in the above-mentioned Example 3 except that the additive amount of 9,9-bis(3-methyl-4-aminophenyl)-2,7-bis(2-hydroxy-2-methyl-3-butynyl)fluorene and 2,2'-bis(trifluoromethyl)-4,4'-diaminobiphenyl were changed to 0.67 g and 0.40 g, respectively. Here, the weight-average molecular weight of this polymer was 34,000 and the glass transition temperature thereof was 192° C.

It was confirmed that the composition of the obtained polymer was polyimide represented by the above-mentioned formula (2) (in which, m:n=50:50, R is C≡C—C(CH$_3$)$_2$(OH)).

The obtained polymer was formed into a film in the same manner as in Example 1 (dry thickness: 4.5 μm). Δnxz of the obtained film in 550 nm was 0.028. The wavelength dispersion of retardation in the thickness direction of this film was measured. The results are shown in FIG. 2. Rth(450)/Rth(550) of Example 4 was 1.03.

Example 5

9,9-bis(3-methyl-4-aminophenyl)-2,7-bis(trimethylsilylethynyl)fluorene was synthesized by the same method as the synthesis of diethynylfluorene in the above-mentioned Example 1

0.32 g of 9,9-bis(3-methyl-4-aminophenyl)-2,7-bis(trimethylsilylethynyl)fluorene, 0.54 g of 2,2'-bis(trifluoromethyl)-4,4'-diaminobiphenyl and 1.00 g of 2,2'-bis(3,4'-dicarboxyphenyl)hexafluoro propane were dissolvend in 4.34 g of DMAC under nitrogen atmosphere and stirred at room temperature for 7 hours.

Thereafter, 12.41 g of DMAC was added thereto, and 0.43 g of pyridine and 0.55 g of acetic anhydride were further added thereto and stirred for 16 hours.

The obtained reaction solution was dropped into isopropyl alcohol (IPA) to perform reprecipitation. The obtained polymer was filtered and washed with IPA twice to thereby obtain 1.16 g of a white polymer.

It was confirmed by the NMR that the composition of the obtained polymer was polyimide represented by the following formula (5) (in which, m:n=24:76).

Here, the weight-average molecular weight of this polymer was 201,000 and the glass transition temperature thereof was 174.7° C.

ethynyl)fluorene and 2,2'-bis(trifluoromethyl)-4,4'-diaminobiphenyl were changed to 0.64 g and 0.36 g, respectively. Here, the weight-average molecular weight of the polymer was 179,000 and the glass transition temperature thereof was 188.1° C.

It was confirmed that the composition of the obtained polymer was polyimide represented by the above-mentioned formula (5) (in which, m:n=48:52).

Figure 3:
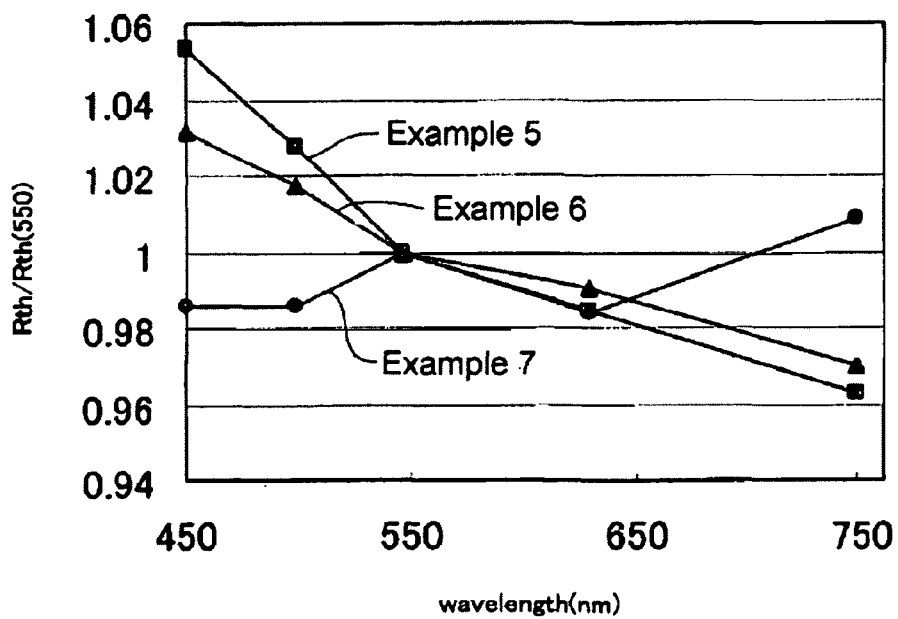
FIG. 3 is a graph view showing the wavelength dispersion of Examples 5 to 7.

The obtained polymer was formed into a film by the same manner as in Example 1 (dry thickness: 6.2 μm). Δnxz of the obtained film in 550 nm was 0.018. The wavelength dispersion of retardation in the thickness direction of this film was measured. The results are shown in FIG. 3.

Rth(450)/Rth(550) of Example 6 was 1.03. Also, n$_d$ was 1.64.

Example 7

The polymer was synthesized by the same method as in the above-mentioned Example 5 except that the additive amount of 9,9-bis(3-methyl-4-aminophenyl)-2,7-bis(trimethylsilylethynyl)fluorene, 2,2'-bis(trifluoromethyl)-4,4'-diaminobiphenyl, and 2,2'-bis(3,4'-dicarboxyphenyl)hexafluoropropane were changed to 0.48 g, 0.09 g, and 0.50 g, respectively. Here, the weight-average molecular weight of this polymer is 120,000 and the glass transition temperature thereof was 168.5° C.

It was confirmed that the composition of the obtained polymer was polyimide represented by the above-mentioned formula (5) (in which, m:n=77:23).

The obtained polymer was formed into a film by the same manner as in Example 1 (dry thickness: 6.6 μm). Δnxz of the obtained film in 550 nm was 0.0082. The wavelength dispersion of retardation in the thickness direction of this film was measured. The results are shown in FIG. 3.

Rth(450)/Rth(550) of Example 7 was 0.98. Also, n$_d$ was 1.66.

Example 8

The polymer was synthesized by the same method as in the above-mentioned Example 5 except that the additive amount

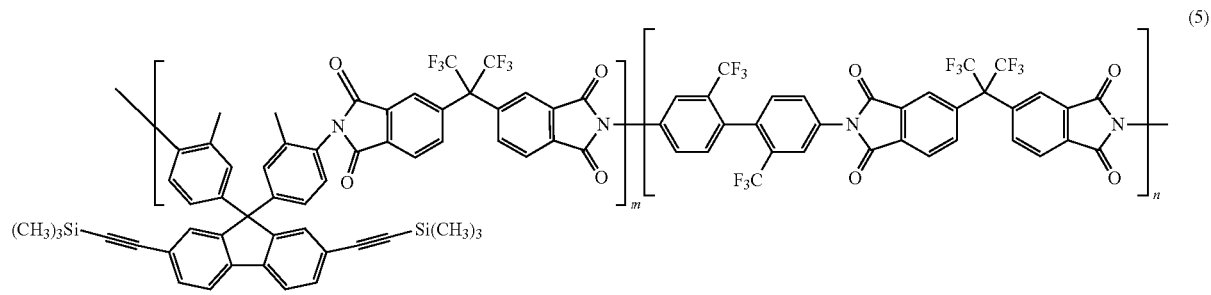

(5)

The above-mentioned polymer was formed into a film by the same manner as in Example 1 (dry thickness: 4.0 μm). Δnxz of the obtained film in 550 nm was 0.028. The wavelength dispersion of retardation in the thickness direction of this film was measured. The results are shown in FIG. 3.

Rth(450)/Rth(550) of Example 5 was 1.05. Also, n$_d$ was 1.63.

Example 6

The polymer was synthesized by the same method as in the above-mentioned Example 5 except that the additive amount of 9,9-bis(3-methyl-4-aminophenyl)-2,7-bis(trimethylsilylof 9,9-bis(3-methyl-4-aminophenyl)-2,7-bis(trimethylsilylethynyl)fluorene and 2,2'-bis(3,4'-dicarboxyphenyl)hexafluoropropane were changed to 0.64 g and 0.50 g, respectively, and 2,2'-bis(trifluoromethyl)-4,4'-diaminobiphenyl was not used. Here, the weight-average molecular weight of this polymer was 44,900 and the glass transition temperature thereof was 174.1° C.

It was confirmed that the composition of the obtained polymer was polyimide represented by the above-mentioned formula (5) (in which, m:n=100:0).

The obtained polymer was formed into a film by the same method as in Example 1 (dry thickness: 5.6 μm). Δnxz of the obtained film in 550 nm was 0.0027. Also, n$_d$ was 1.71.

Comparative Example 1

The polymer was synthesized by the same method as in the above-mentioned Example 1 except that 9,9-bis(3-methyl-4-aminophenyl)-2,7-bis(trimethylsilylethynyl)fluorene was replaced with 9,9-bis(3-methyl-4-aminophenyl) fluorene. Here, the weight-average molecular weight of this polymer was 22,100 and the glass transition temperature thereof was 191° C.

It was confirmed that the composition of the obtained polymer was polyimide represented by the above-mentioned formula (2) (in which, m:n=26:74, R is H (hydrogen atom)).

Figure 4:
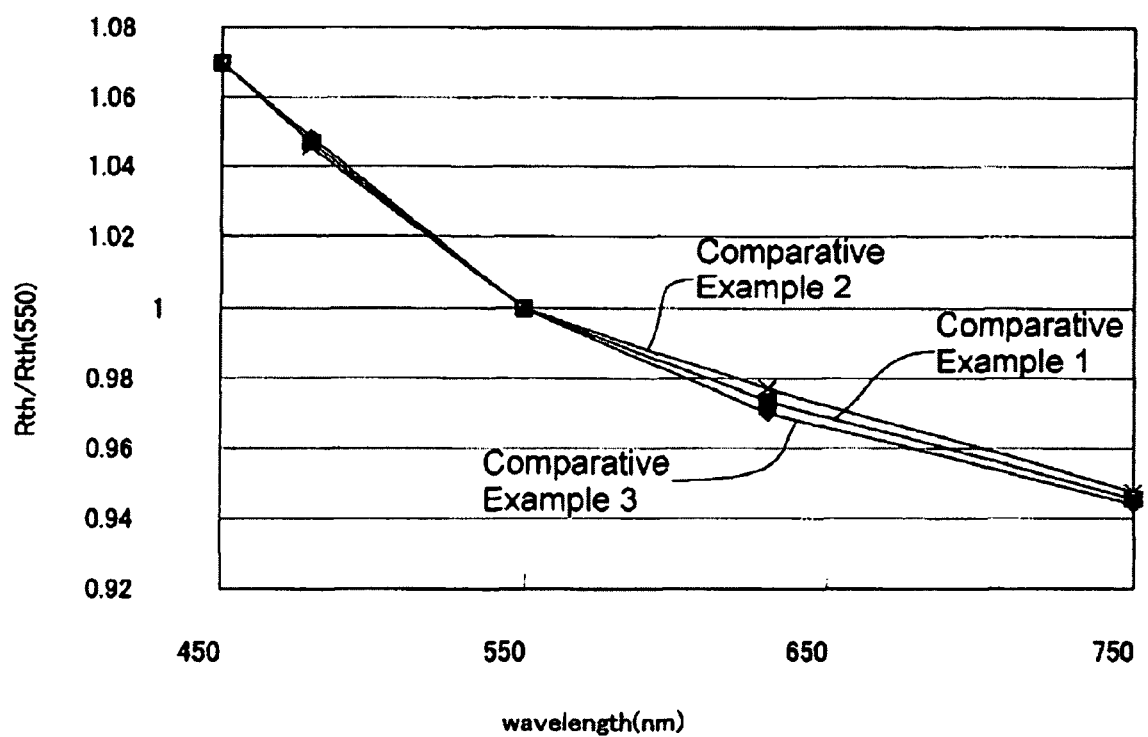
FIG. 4 is a graph view showing the wavelength dispersion of Comparative Examples 1 to 3.

The obtained polymer was formed into a film by the same method as in Example 1 (dry thickness: 5.7 μm). Δnxz of the obtained film in 550 nm was 0.041. The wavelength dispersion of retardation in the thickness direction of this film was measured. The results are shown in FIG. 4.

Rth(450)/Rth(550) of Comparative Example 1 was 1.07.

Comparative Example 2

The polymer was synthesized by the same method as in the above-mentioned Example 2 except that 9,9-bis(3-methyl-4-aminophenyl)-2,7-bis(trimethylsilylethynyl)fluorene was replaced with 9,9-bis(3-methyl-4-aminophenyl) fluorene. Here, the weight-average molecular weight of this polymer was 18,300 and the glass transition temperature thereof was 185° C.

It was confirmed that the composition of the obtained polymer was polyimide represented by the above-mentioned formula (2) (in which, m:n=50:50, R is H (hydrogen atom)).

The obtained polymer was formed into a film by the same method as in Example 1 (dry thickness: 4.4 μm). Δnxz of the obtained film in 550 nm was 0.032. The wavelength dispersion of retardation in the thickness direction of this film was measured. The results are shown in FIG. 4.

Rth(450)/Rth(550) of Comparative Example 2 was 1.07.

Comparative Example 3

1.00 g of 2,2'-bis(trifluoromethyl)-4,4'-diaminobiphenyl and 1.13 g of 1,1'-dichlorobiphenyl-3,3',4,4'-tetracarboxylic dianhydride were dissolvend in 3.11 g of DMAC under nitrogen atmosphere and stirred at room temperature for 7 hours. After that, the polymer was synthesized by the same method as in Example 1. Here, the weight-average molecular weight of this polymer was 100,000 and the glass transition temperature thereof was 178° C.

It was confirmed that the composition of the obtained polymer was polyimide represented by the following formula (4).

The obtained polymer was formed into a film by the same method as in Example 1 (dry thickness: 4.6 μm). Δnxz of the obtained film in 550 nm was 0.075. The wavelength dispersion of retardation in the thickness direction of this film was measured. The results are shown in FIG. 4 (here, the results of Comparative Example 3 are shown in FIG. 1 for comparison).

Rth(450)/Rth(550) of Comparative Example 3 was 1.07.

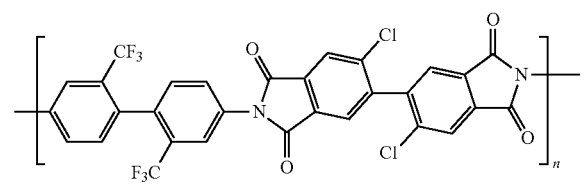

(4)

When the wavelength dispersion of retardation of Examples 1 and 2 is contrasted with the wavelength dispersion of retardation of Comparative Example 3, it is found that the films of Examples 1 and 2 exhibit the flat dispersion.

Further, it is found that the film of Example 2 with large introduction amount of 9,9-bis(3-methyl-4-aminophenyl)-2,7-bis(trimethylsilylethynyl)fluorene exhibits optical property closer to the flat dispersion as compared with Example 1. The contrast of Examples 3 and 4 as well as the contrast of Examples 5 and 6 is the same.

What is claimed is:

1. An optical film comprising a polymer having 5% by mol or more of a repeating unit represented by the following general formula (I):

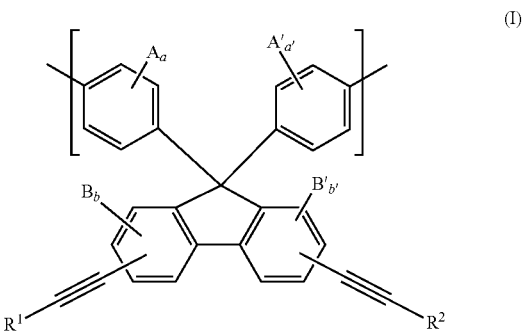

(I)

wherein, A, A', B and B' each denote a substituent, a and a' denote substitution number (an integer of 0 to 4) of the corresponding A and A', b and b' denote substitution number (an integer of 0 to 3) of the corresponding B and B', A, A', B and B' each independently denote halogen or an alkyl group with a carbon number of 1 to 4, and $R^1$ and $R^2$ each independently denote hydrogen, halogen, an alkyl group with a carbon number of 1 to 10, a substituted or unsubstituted vinyl group, a substituted or unsubstituted ethynyl group, $SiR^3R^4R^5$ ($R^3$ to $R^5$ are each an alkyl group with a carbon number of 1 to 6 or an aryl group), or $CR^6R^7(OH)$ ($R^6$ and $R^7$ are each an alkyl group with a carbon number of 1 to 4).

2. The optical film according to claim 1, wherein the polymer is a polyimide-based polymer.

3. The optical film according to claim 2, wherein the polyimide-based polymer has a repeating unit represented by the following general formula (II):

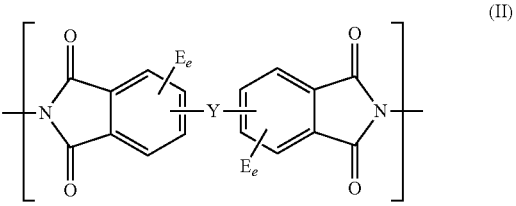

(II)

wherein, Y denotes a covalent bond, or an atom or a group selected from the group consisting of a $CH_2$ group, a $C(CH_3)_2$ group, a $C(CZ_3)_2$ group (herein, Z is halogen), a CO group, an O atom, an S atom, an $SO_2$ group, an $Si(CH_2CH_3)_2$ group, and an $N(CH_3)$ group, E is a substituent, e denotes substitution number (an integer of 0 to 3) of E, and E is halogen, an alkyl group with a carbon number of 1 to 3, a halogenated alkyl group with a carbon number of 1 to 3, a phenyl group, or a substituted phenyl group, wherein when there are a plurality of Es, each of Es is the same or different.

4. The optical film according to claim 2, wherein the polyimide-based polymer has a repeating unit represented by the following general formula (II) and a repeating unit represented by the following general formula (III):

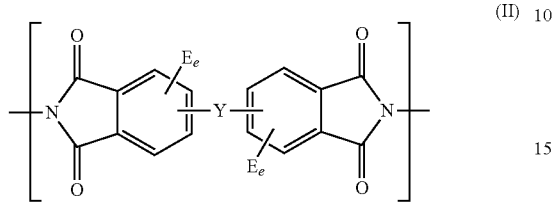

wherein, Y denotes a covalent bond, or an atom or a group selected from the group consisting of a $CH_2$ group, a $C(CH_3)_2$ group, a $C(CZ_3)_2$ group (wherein, Z is halogen), a CO group, an O atom, an S atom, an $SO_2$ group, an $Si(CH_2CH_3)_2$ group, and an $N(CH_3)$ group, E is a substituent, e denotes substitution number (an integer of 0 to 3) of E, and E is halogen, an alkyl group with a carbon number of 1 to 3, a halogenated alkyl group with a carbon number of 1 to 3, a phenyl group, or a substituted phenyl group, wherein when there are a plurality of Es, each of Es is the same or different,

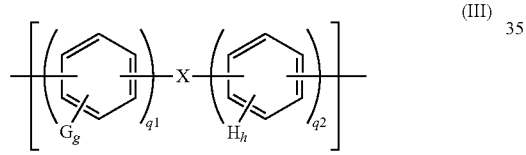

wherein, X denotes a covalent bond, or an atom or a group selected from the group consisting of a $CH_2$ group, a

[Formula 6]

$C(CH_3)_2$ group, a $C(CZ_3)_2$ group (wherein, Z is halogen), a CO group, an O atom, an S atom, an $SO_2$ group, an $Si(CH_2CH_3)_2$ group, and an $N(CH_3)$ group, G and H are a substituent, g denotes substitution number (an integer of 0 to 4) of G, h denotes substitution number (an integer of 0 to 4) of H, G and H each identically or differently denote an atom or a group selected from the group consisting of halogen, an alkyl group, a substituted alkyl group, a nitro group, a cyano group, a thioalkyl group, an alkoxy group, an aryl group, a substituted aryl group, an alkyl ester group, and a substituted alkyl ester group, wherein when there are a plurality of G and H, each of G and H is the same or different, q1 denotes an integer of 0 to 3, and q2 denotes an integer of 1 to 3.

5. The optical film according to claim 1, wherein the general formula (I) is represented by the following general formula (IV):

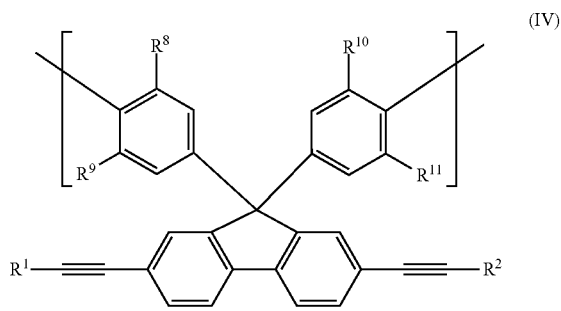

wherein, $R^8$ to $R^{11}$ each independently denote hydrogen or a methyl group, and $R^1$ and $R^2$ are the same as the formula (I).

6. The optical film according to claim 1, wherein the $R^1$ and $R^2$ are each independently hydrogen, an alkyl group with a carbon number of 1 to 6, a trimethylsilyl group, or a $C(CH_3)_2(OH)$ group.

7. The optical film according to claim 1, wherein the polymer is a polyimide-based polymer represented by the following general formula (V):

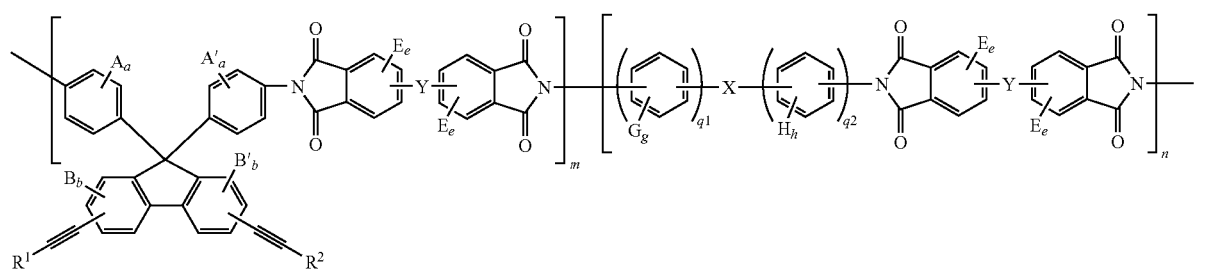

wherein, Aa, A'a', Bb and B'b', as well as $R^1$ and $R^2$ are the same as the formula (I), X and Y denote a covalent bond or an atom or a group selected from the group consisting of a $CH_2$ group, a $C(CH_3)_2$ group, a $C(CZ_3)_2$ group (wherein, Z is halogen), a CO group, an O atom, an S atom, an $SO_2$ group, an $Si(CH_2CH_3)_2$ group, and an N(CH$_3$) group, E is a substituent, e denotes substitution number (an integer of 0 to 3) of E, E is halogen, an alkyl group with a carbon number of 1 to 3, a halogenated alkyl group with a carbon number of 1 to 3, a phenyl group, or a substituted phenyl group, wherein when there are a plurality of Es, each of Es is the same or different, G and H are substituents, g denotes substitution number (an integer of 0 to 4) of G, h denotes substitution number (an integer of 0 to 4) of H, G and H each identically or differently denote an atom or a group selected from the group consisting of halogen, an alkyl group, a substituted alkyl group, a nitro group, a cyano group, a thioalkyl group, an alkoxy group, an aryl group, a substituted aryl group, an alkyl ester group, and a substituted alkyl ester group, wherein when there are a plurality of G and H, each of G and H is the same or different, q1 denotes an integer of 0 to 3, q2 denotes an integer of 1 to 3, m denotes 1 to 90% by mol, and n denotes 10 to 70% by mol.

8. The optical film according to claim 1, which is composed of a coating film obtained by coating the polymer on a base material.

9. The optical film according to claim 1, which has a thickness of 20 μm or less.

10. The optical film according to claim 1, exhibiting Rth(450)/Rth(550)≦1.06:

wherein, Rth(450) and Rth(550) denote a retardation value in the thickness direction at a wavelength of 450 nm and a wavelength of 550 nm, respectively.

11. The optical film according to claim 1, exhibiting Rth(650)/Rth(550)≧0.95:

wherein, Rth(550) and Rth(650) denote a retardation value in the thickness direction at a wavelength of 550 nm and a wavelength of 650 nm, respectively.

12. The optical film according to claim 1, exhibiting nx≅ny>nz:

wherein, nx denotes a refractive index in a direction (X-axis direction) such that a refractive index in a film plane becomes the maximum, ny denotes a refractive index in a direction (Y-axis direction) orthogonal to the X-axis direction in the plane, and nz denotes a refractive index in a direction orthogonal to the X-axis direction and the Y-axis direction.

13. The optical film according to claim 1, exhibiting nx>ny>nz:

wherein, nx denotes a refractive index in a direction (X-axis direction) such that a refractive index in a film plane becomes the maximum, ny denotes a refractive index in a direction (Y-axis direction) orthogonal to the X-axis direction in the plane, and nz denotes a refractive index in a direction orthogonal to the X-axis direction and the Y-axis direction.

* * * * *